(12) United States Patent
Saito

(10) Patent No.: US 9,671,831 B2
(45) Date of Patent: Jun. 6, 2017

(54) ELECTRONIC APPARATUS AND ARM DEVICE

(71) Applicant: FUJITSU LIMITED, Kawasaki-shi, Kanagawa (JP)

(72) Inventor: Akira Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/824,213

(22) Filed: Aug. 12, 2015

(65) Prior Publication Data
US 2016/0048176 A1    Feb. 18, 2016

(30) Foreign Application Priority Data

Aug. 15, 2014   (JP) ................................. 2014-165455

(51) Int. Cl.
   *G06F 1/16*   (2006.01)
(52) U.S. Cl.
   CPC .......... *G06F 1/1681* (2013.01); *G06F 1/1616* (2013.01); *E05Y 2900/606* (2013.01)
(58) Field of Classification Search
   CPC combination set(s) only.
   See application file for complete search history.

(56) References Cited

U.S. PATENT DOCUMENTS

| | | | | |
|---|---|---|---|---|
| 5,085,394 A | * | 2/1992 | Torii ...................... | G06F 1/1616 248/455 |
| 5,107,402 A | * | 4/1992 | Malgouires ........... | F16C 11/103 16/307 |
| 5,200,913 A | * | 4/1993 | Hawkins ............... | G06F 1/1615 345/168 |
| 5,333,116 A | * | 7/1994 | Hawkins ............... | G06F 1/1615 345/169 |
| 6,288,891 B1 | * | 9/2001 | Hasegawa ............... | F16M 11/10 248/923 |
| 6,366,935 B2 | * | 4/2002 | Hawkins ............... | G06F 1/1615 345/169 |
| 6,532,147 B1 | * | 3/2003 | Christ, Jr. ............. | G06F 1/1615 248/917 |
| 6,980,423 B2 | * | 12/2005 | Tanaka .................... | G06F 1/162 248/917 |
| 7,184,263 B1 | * | 2/2007 | Maskatia ............... | G06F 1/1616 248/917 |
| 7,239,505 B2 | * | 7/2007 | Keely ................... | G06F 1/1616 361/679.09 |

(Continued)

FOREIGN PATENT DOCUMENTS

| | | |
|---|---|---|
| JP | 2001-34181 A | 2/2001 |
| JP | 2001-134200 A | 5/2001 |

*Primary Examiner* — Lisa Lea Edmonds
(74) *Attorney, Agent, or Firm* — Westerman, Hattori, Daniels & Adrian, LLP

(57) ABSTRACT

An electronic apparatus includes: a fixed bracket; an arm base that is rotatably coupled to the fixed bracket; a movable arm that is coupled to the arm base and tilts with respect to the arm base; a movable device that is coupled to the movable arm, and that rotates with respect to the movable arm and is landed on a mounting face; an arm elastic body that is provided on the arm base, and biases the movable arm in a rising direction in which the movable arm is raised against the mounting face; and a base elastic body that is provided on the fixed bracket, and biases the arm base in the rising direction of the movable arm.

18 Claims, 19 Drawing Sheets

(56) References Cited

U.S. PATENT DOCUMENTS

| | | | | |
|---|---|---|---|---|
| 7,652,873 B2* | 1/2010 | Lee | .................. | E05B 65/006 |
| | | | | 248/917 |
| 8,477,486 B2* | 7/2013 | Yang | .................. | H04M 1/0237 |
| | | | | 16/286 |
| 8,654,520 B2* | 2/2014 | Lin | .................. | G06F 1/1624 |
| | | | | 361/679.02 |
| 8,988,863 B2* | 3/2015 | Hung | .................. | G06F 1/1601 |
| | | | | 248/917 |
| 9,134,755 B2* | 9/2015 | Onda | .................. | G06F 1/1601 |
| 9,277,659 B2* | 3/2016 | Onda | .................. | H05K 5/0217 |
| 9,304,553 B2* | 4/2016 | Park | .................. | G06F 1/1681 |
| 9,380,719 B2* | 6/2016 | Onda | .................. | G06F 1/16 |
| 2002/0145847 A1* | 10/2002 | Crosby | .................. | F16M 11/10 |
| | | | | 361/679.02 |
| 2007/0058329 A1* | 3/2007 | Ledbetter | .................. | F16M 11/04 |
| | | | | 361/679.06 |
| 2014/0043749 A1* | 2/2014 | Lai | .................. | G06F 1/1681 |
| | | | | 361/679.27 |
| 2014/0063720 A1* | 3/2014 | Chang | .................. | G06F 1/1637 |
| | | | | 361/679.27 |
| 2014/0185224 A1* | 7/2014 | Chen | .................. | G06F 1/1622 |
| | | | | 361/679.27 |
| 2014/0328012 A1* | 11/2014 | Myerchin | .................. | G06F 1/16 |
| | | | | 361/679.22 |
| 2015/0077915 A1* | 3/2015 | Saito | .................. | F16M 11/105 |
| | | | | 361/679.22 |

* cited by examiner

ELECTRONIC APPARATUS AND ARM DEVICE

CROSS-REFERENCE TO RELATED APPLICATION

This application is based upon and claims the benefit of priority of the prior Japanese Patent Application No. 2014-165455, filed on Aug. 15, 2014, the entire contents of which are incorporated herein by reference.

FIELD

The embodiments discussed herein are related to an electronic apparatus and an arm device.

BACKGROUND

A conventional electronic apparatus includes a movable arm tiltably coupled to an arm base, a display rotatably coupled to the movable arm, and a torsion spring that is provided on the arm base and biases the movable arm in a rising direction in which the movable arm is raised. Related conventional documents are Japanese Laid-open Patent Publications Nos. 2001-134200 and 2001-34181.

SUMMARY

According to an aspect of the invention, an electronic apparatus includes: a fixed bracket; an arm base that is rotatably coupled to the fixed bracket; a movable arm that is coupled to the arm base and tilts with respect to the arm base; a movable device that is coupled to the movable arm, and that rotates with respect to the movable arm and is landed on a mounting face; an arm elastic body that is provided on the arm base, and biases the movable arm in a rising direction in which the movable arm is raised against the mounting face; and a base elastic body that is provided on the fixed bracket, and biases the arm base in the rising direction of the movable arm.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In an electronic apparatus in which a display is rotatably coupled to a movable arm, for example, with a rotation with respect to an arm base, the movable arm moves between a retracted position and an expanded position. The movable arm is kept at a predetermined tilt angle (rotational angle) in the state where the lower end of the display is landed on a mounting face.

In order to adjust the tilt angle of the movable arm, the user first grips a lower portion of the display and lifts it slightly upward. Thus, the movable arm is slightly rotated in a rising direction, and the lower end of the display floats above the mounting face. At this time, a torsion spring aids the rotation of the movable arm in the rising direction.

Next, when the user pulls out the lower portion of the display forward in the state where the display floats above the mounting face, the movable arm tilts forward and moves to the expanded position. On the other hand, when the user pushes the lower portion of the display rearward in the state where the display floats above the mounting face, the movable arm rotates in the rising direction in which the movable arm is raised rearward, and moves to the retracted position. At this time, the torsion spring aids the rotation of the movable arm in the rising direction.

To facilitate the user to lift the display upward, the spring constant of the torsion spring can be increased.

However, a bias force (restoring force) of the torsion spring becomes larger as the movable arm tilts more, and becomes maximum at the expanded position.

For this reason, when the spring constant of the torsion spring is large, the bias force of the torsion spring at the expanded position becomes excessive, such that the movable arm may fail to reach the predetermined expanded position. On the other hand, when the spring constant of the torsion spring is small, the bias force of the torsion spring at the retracted position becomes too small, making it difficult to lift the display upward.

One aspect of an embodiment disclosed herein may facilitate lifting-up of the display. The embodiment according to the technique disclosed in this application will be described below. As depicted in each figure as appropriate, an arrow X represents the front side of the electronic apparatus in the forward and rearward direction, an arrow Y represents the outer side of the electronic apparatus in the width direction, and an arrow Z represents the upper side of the electronic apparatus in the vertical direction.

(Electronic Apparatus)

Figure 1:
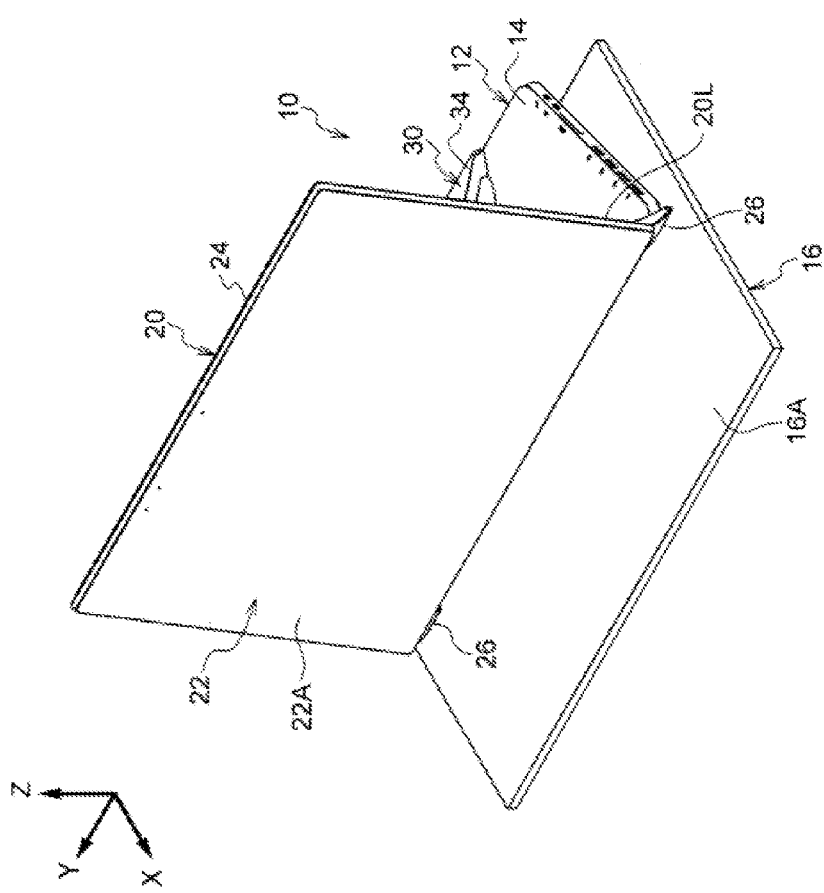
FIG. 1 is a perspective view illustrating an electronic apparatus in accordance with an embodiment.
Figure 2:
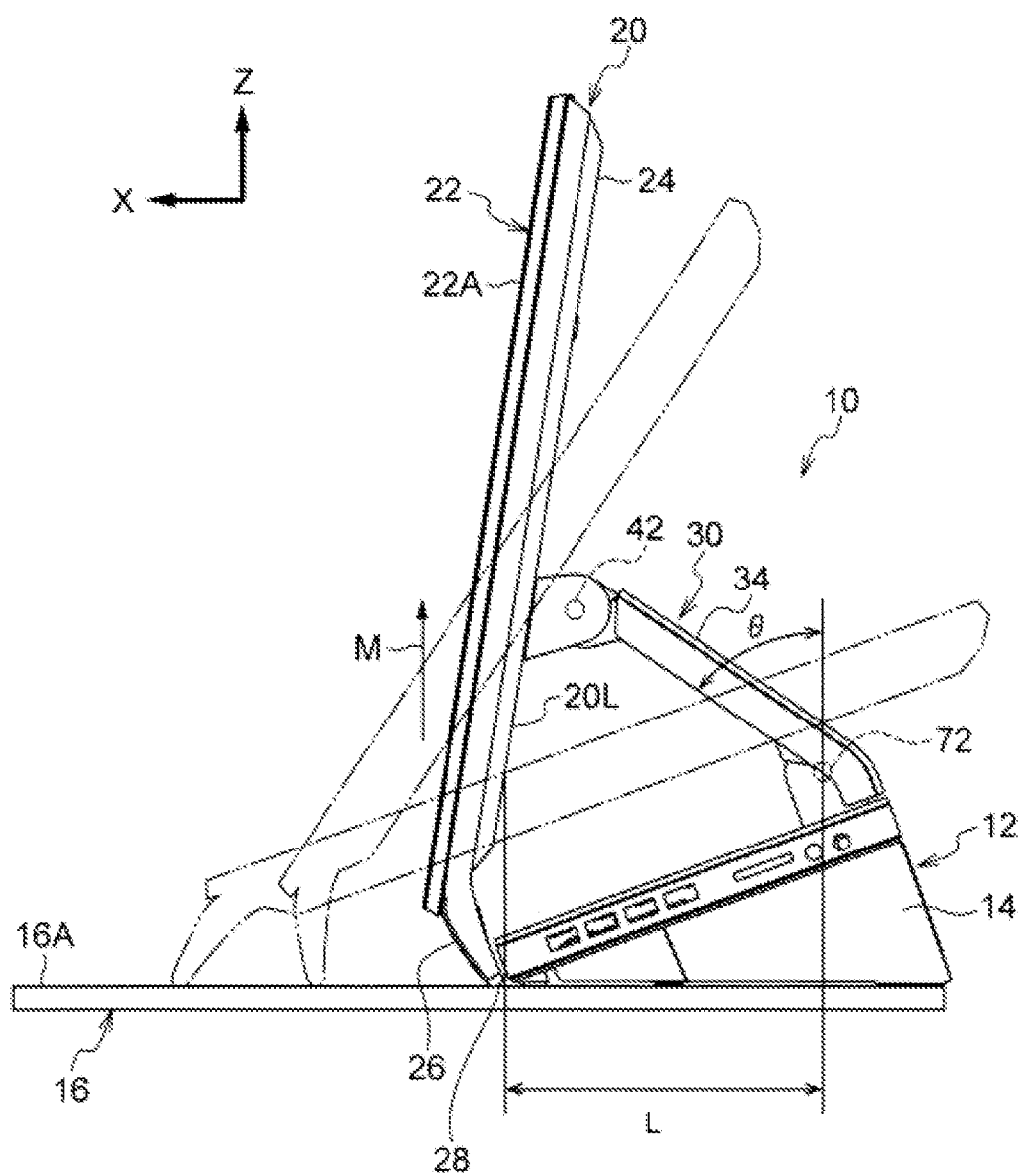
FIG. 2 is a side view illustrating the state where the electronic apparatus in FIG. 1 is located at a retracted position.

As illustrated in FIG. 1 and FIG. 2, an electronic apparatus 10 in accordance with this embodiment includes a main body 12, a display 20, and a stand arm 30. The electronic apparatus 10 is a display-integrated personal computer in which the display 20 is integrated with the main body 12 via the stand arm 30. The display 20 is an example of a movable device. The stand arm is an example of an arm device.

The main body 12 has a housing 14 that accommodates a board on which a plurality of electronic components such as a CPU are mounted. The housing 14 is shaped like a thin box, and is disposed such that its longitudinal direction matches the width direction of the electronic apparatus 10 (direction as expressed by the arrow Y). The main body 12 is installed, for example, on a mounting face (upper face) 16A of a top plate 16 of a desk or the like.

The display 20 has a touch panel 22 and a back cover 24 that covers the back face of the touch panel 22. The front surface of the touch panel 22 is a display face 22A that displays an image for a touch operation. The display 20 in this embodiment is a full flat-type display without any step on the outer circumference of the display face 22A.

A pair of legs 26 that support the display 20 on the mounting face 16A are provided at the lower end of the back cover 24. The pair of legs 26 protrude downward from both sides of the lower end of the back cover 24, and are landed on the mounting face 16A. The pair of legs 26 each have a non-slip member 28 at its tip (lower end), which is made of rubber, for example (See FIG. 2).

As illustrated in FIG. 2, the stand arm 30 is disposed behind the rear face of the display 20. One end (lower end) of the stand arm 30 is tiltably (rotatably) coupled to the rear end of the main body 12 via a lower rotational shaft 72 having the axial direction that is the width direction of the electronic apparatus 10. Thus, the stand arm 30 tilts about the lower rotational shaft 72 in the forward and rearward direction of the electronic apparatus 10 with respect to the main body 12. The rear face of the display 20 is attached to the other end (upper end) of the stand arm 30. θ in FIG. 2 denotes a tilt angle (rotational angle) of the stand arm 30 (movable arms 36) relative to the vertical direction.

Figure 3:
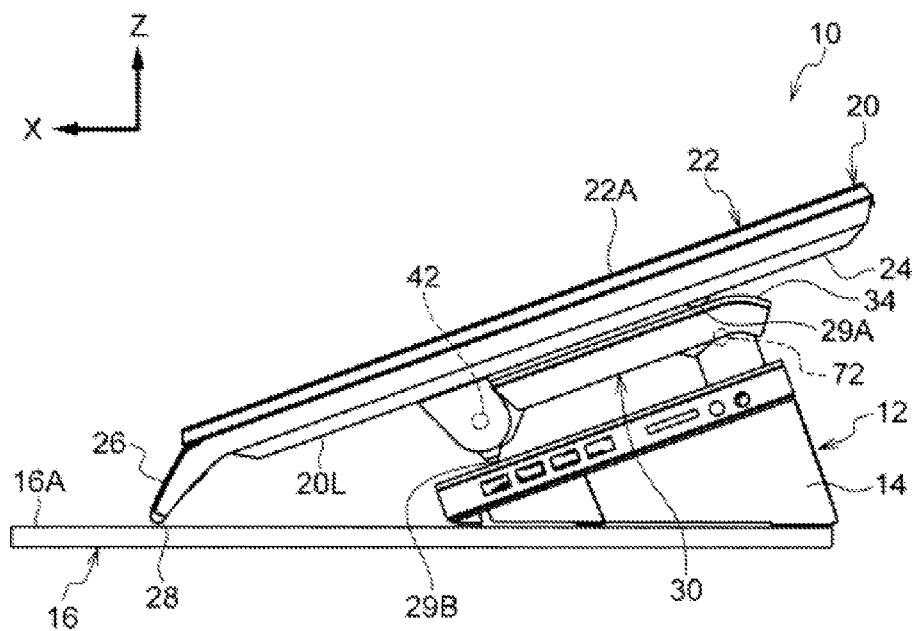
FIG. 3 is a side view illustrating the state where the electronic apparatus in FIG. 1 is located at an expanded position.

The display 20 is rotatably coupled to the other end (upper end) of the stand arm 30 via an upper rotational shaft 42 extending in the same direction as the lower rotational shaft 72. The display 20 and the stand arm 30 are linked with each other via a below-mentioned link mechanism 130. When the display 20 rotates with respect to the stand arm 30, the stand arm 30 rotates with respect to the main body 12. Thereby, the display 20 moves between a retracted position expressed by a solid line in FIG. 2 and an expanded position expressed by a solid line in FIG. 3. At both of the retracted position and the expanded position, the pair of legs 26 of the display 20 are landed on the mounting face 16A.

At the retracted position, the display 20 is disposed behind and above the expanded position with the display face 22A oriented to the front side (side of the arrow X). That is, at the retracted position, the display 20 is disposed around the height of the user's eye in the vertical position where the display face 22A faces the front side. Therefore, the user can readily view the display face 22A of the display 20.

At the expanded position, the display 20 is disposed in front of and below the retracted position where the display face 22A faces the upper side (the side of the arrow Z). That is, at the expanded position, the display 20 is disposed at the user's hand in the lying position where the display face 22A faces the upper side. Therefore, the user can readily touch the display face 22A of the display 20.

At the expanded position, a support section 29A on the rear face of the display 20 contacts the rear face of the stand arm 30. A support section 29B at the upper end of the stand arm 30 on the side of the main body 12 contacts the upper face of the main body 12. This suppresses a rattle of the display 20 due to a touch on the display face 22A.

Configuration of the stand arm 30 and the link mechanisms 130 will be described below.

(Stand Arm)

Figure 4:
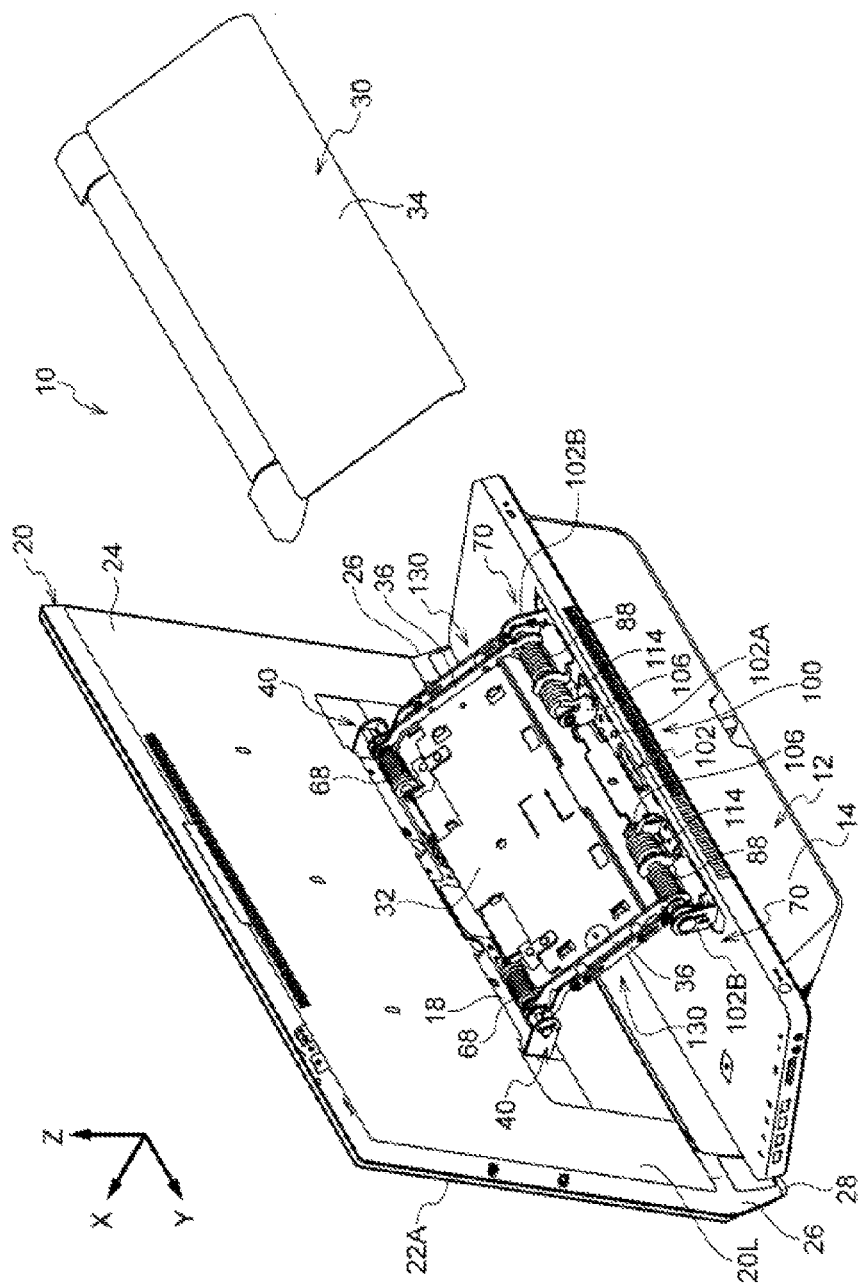
FIG. 4 is a perspective view illustrating the state where a back cover is removed from a stand arm in FIG. 1.

As illustrated in FIG. 4, the stand arm 30 includes a panel frame 32, a back cover 34, a pair of movable arms 36, a pair of upper hinges 40, a pair of lower hinges 70, a fixed bracket 100, and a pair of link mechanisms 130.

The panel frame 32 is a rectangular plate. The back cover 34 is attached to the rear face of the panel frame 32. The pair of movable arms 36 are provided on both sides of the panel frame 32 in the width direction.

The pair of movable arms 36 are provided along both ends of the panel frame 32, and are interconnected via the panel frame 32. A cable not illustrated that connects the main body 12 to the display 20 is wired between the pair of movable arms 36.

(Upper Hinge)

Figure 5:
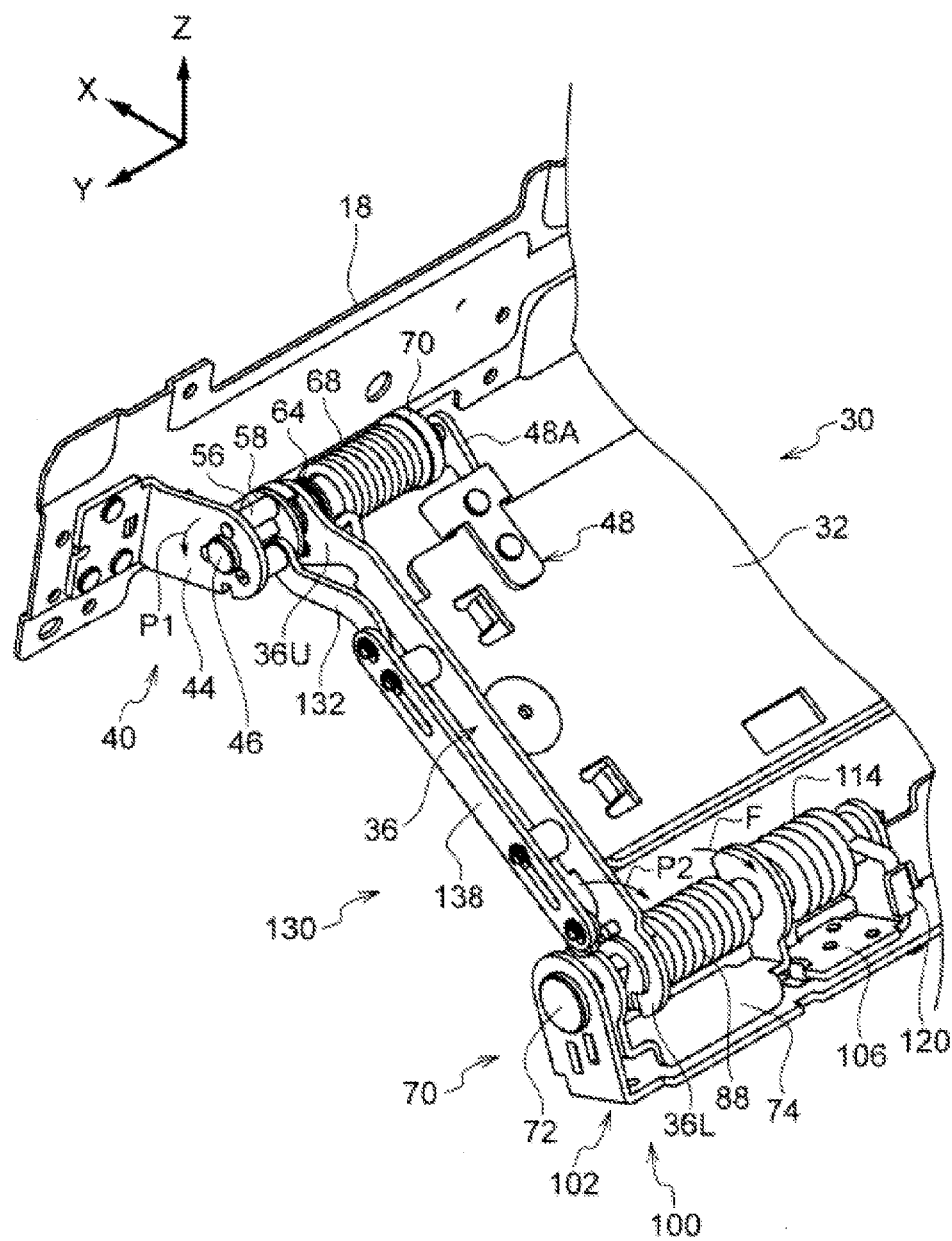
FIG. 5 is a partial enlarged view of FIG. 4.

As illustrated in FIG. 5, the upper hinge 40 is provided at an upper end 36U of the movable arm 36. The upper hinge 40 is fixed to the rear face of the display 20 via a base plate 18 (See FIG. 4).

Figure 6:
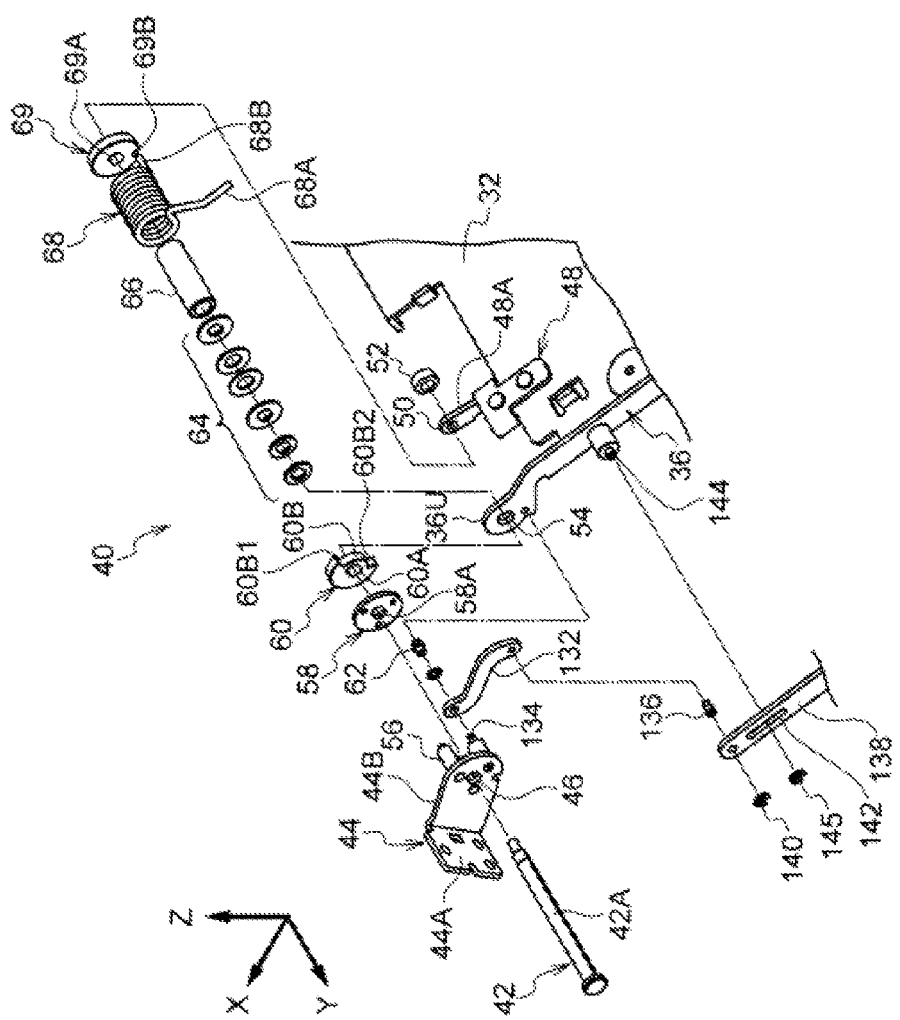
FIG. 6 is an exploded perspective view illustrating an upper hinge in FIG. 5.

As illustrated in FIG. 6, the upper hinge 40 includes an upper rotational shaft 42, a hinge base 44, a support bracket 48, a rotation restraining member 60, a plurality of disc springs 64, a collar member 66, a movable device torsion spring 68, and a locking plate 69.

The upper rotational shaft 42 is disposed along the width direction of the electronic apparatus 10. This upper rotational shaft 42 has a shaft portion 42A. A whirl stop flat face is formed on the outer circumferential face of the shaft portion 42A. The upper rotational shaft 42 is supported by the hinge base 44 and the support bracket 48.

The hinge base 44 has a fixed wall 44A and a support wall 44B. The fixed wall 44A is plate-like, and is fixed to the base plate 18 with a screw not illustrated or the like (See FIG. 5). The support wall 44B has a rectangular through hole 46 into which the shaft portion 42A of the upper rotational shaft 42 can be unrotatably inserted.

The support bracket 48 is fixed to the upper end of the panel frame 32. The support bracket 48 has a support wall 48A that forms a pair with the support wall 44B of the hinge base 44. The support wall 48A is disposed opposed to the support wall 44B of the hinge base 44. The support wall 48A has a through hole 50 into which the shaft portion 42A of the upper rotational shaft 42 is rotatably inserted. The shaft portion 42A of the upper rotational shaft 42 is fixed to the support wall 48A of the support bracket 48 with a nut 52.

The upper end 36U of the movable arm 36 is disposed between the pair of support walls 44B, 48A. The upper end 36U of the movable arms 36 has a through hole 54 into which the shaft portion 42A of the upper rotational shaft 42 is rotatably inserted. The upper end 36U of the movable arms 36 is rotatably coupled to the hinge base 44 via the upper rotational shaft 42.

A tubular spacer 56 and a space plate 58 are disposed between the support wall 44B of the hinge base 44 and the upper end 36U of the movable arms 36.

The space plate 58 is disc-like. The space plate 58 has a rectangular through hole 58A into which the shaft portion 42A of the upper rotational shaft 42 is rotatably inserted. The space plate 58 is attached to the support wall 44B of the hinge base 44 via the tubular spacer 56. This ensures a space for a below-mentioned first coupling link 132 between the support wall 44B and the space plate 58.

The rotation restraining member 60 is disc-like, and is disposed adjacent to the upper end 36U of the movable arm 36. The rotation restraining member 60 has a rectangular through hole 60A into which the shaft portion 42A of the upper rotational shaft 42 is unrotatably inserted. The outer circumference of the rotation restraining member 60 has a notch 60B into which an engagement pin 62 is inserted.

One end of the engagement pin 62 is coupled to the upper end 36U of the movable arm 36, and the other end is coupled to the support wall 44B of the hinge base 44 via the first coupling link 132. With a rotation of the hinge base 44 (display 20) with respect to the movable arms 36, one of edges 60B1 and 60B2 on both sides of the notch 60B is engaged with the engagement pin 62. This restrains the rotation of the hinge base 44 with respect to the movable arms 36.

The disc springs 64, the collar member 66, the movable device torsion spring 68, and the locking plate 69 are disposed between the upper end 36U of the movable arm 36 and the support wall 48A of the support bracket 48.

The collar member 66 is tubular, and receives the shaft portion 42A of the upper rotational shaft 42. The collar member 66 is inserted into the movable device torsion spring 68. The plurality of disc springs 64 are disposed between the collar member 66 and the upper end 36U of the movable arm 36.

The movable device torsion spring 68 is a torsion coil spring. One end 68A of the movable device torsion spring 68 is locked on the rear face of the panel frame 32. The other end 68B of the movable device torsion spring 68 is locked at a notch-shaped locking portion 69B formed on the outer circumference of the locking plate 69. The movable device torsion spring 68 biases the display 20 toward the standing position (the side of the arrow P1 in FIG. 5) via the hinge base 44 at all times. The movable device torsion spring 68 is an example of the movable device elastic body.

The locking plate 69 is disc-like. The locking plate 69 has a rectangular through hole 69A into which the shaft portion 42A of the upper rotational shaft 42 is unrotatably inserted. The notch-like locking portion 69B is formed on the outer circumference of the locking plate 69.

(Lower Hinge)

Figure 7:
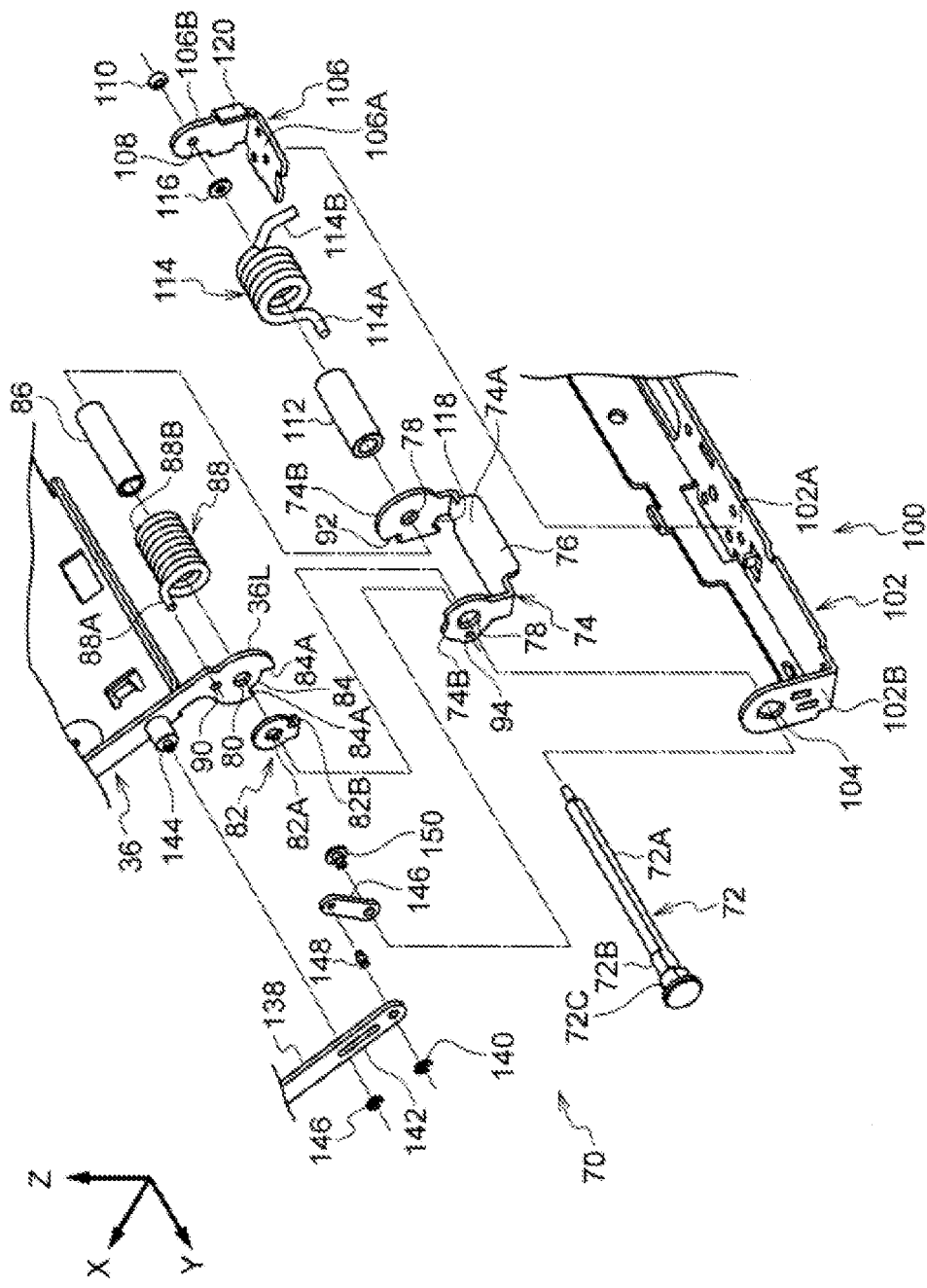
FIG. 7 is an exploded perspective view illustrating a lower hinge in FIG. 5.

As illustrated in FIG. 7, the lower hinge 70 is provided at a lower end 36L of the movable arm 36. The lower hinges 70 each have a lower rotational shaft 72, an arm base 74, a collar member 86, an arm torsion spring 88, and a rotation restraining member 82.

The lower rotational shaft 72 is disposed along the width direction of the electronic apparatus 10. The lower rotational shaft 72 is a stepped shaft having a shaft portion 72A and two stepped portions 72B and 72C provided at one end of the shaft portion 72A. A whirl stop engaging face is formed on the outer circumference of the shaft portion 72A, the stepped portion 72B, and the stepped portion 72C. The arm base 74 is rotatably coupled to the lower rotational shaft 72.

The arm base 74 has a base portion 74A and a pair of support walls 74B. The base portion 74A is opened to the lower side to have a U-shaped cross section. The base portion 74A has a pair of engaging portions 76 (See FIG. 9) that restrain rotation of the arm base 74 with respect to the fixed bracket 100.

The pair of support walls 74B stand up at both ends of the base portion 74A, and are opposed to each other in the width direction of the electronic apparatus 10. The pair of support walls 74B have respective through holes 78. The lower end 36L of the movable arm 36 is disposed between the pair of support walls 74B. The lower end 36L of the movable arm 36 has a through hole 80. By inserting the stepped portion 72B and the shaft portion 72A of the lower rotational shaft 72 into the through holes 78 and 80, respectively, the lower end 36L of the movable arm 36 is rotatably (tiltably) coupled to the arm base 74 via the lower rotational shaft 72.

The rotation restraining member 82, the collar member 86, and the arm torsion spring 88 are disposed between the pair of support walls 74B. The rotation restraining member 82 is disc-like, and is disposed opposed to the lower end 36L of the movable arm 36. The rotation restraining member 82 has a rectangular through hole 82A into which the stepped portion 72B of the lower rotational shaft 72 is unrotatably inserted.

An engaging portion 82B that protrudes toward the lower end 36L of the movable arm 36 is provided on the outer circumference of the rotation restraining member 82. The engaging portion 82B is inserted into a notch 84 formed at the lower end 36L of the movable arm 36. With a rotation of the movable arms 36 with respect to the arm base 74, one of edges 84A on both sides of the notch 84 is engaged with the engaging portion 82B. This restrains the rotation of the movable arms 36 with respect to the arm base 74.

The collar member 86 is tubular, and receives the shaft portion 72A of the lower rotational shaft 72. The collar member 86 is inserted into the arm torsion spring 88.

The arm torsion spring 88 is a torsion coil spring. One end 88A of the arm torsion spring 88 is locked to a locking portion 90 formed at the lower end 36L of the movable arm 36. In this embodiment, the locking portion 90 is a hole into which the one end 88A of the arm torsion spring 88 is inserted.

The other end 88B of the arm torsion spring 88 is formed on a notch-like locking portion 92 formed on the outer circumference of one support wall 74B of the arm base 74. The arm torsion spring 88 biases the arm base 74 to lift the movable arms 36 in the rising direction (direction of an arrow P2 in FIG. 5) at all times. The arm torsion spring 88 is an example of the arm elastic body.

The other support walls 74B of the arm base 74 has an attachment hole 94 to which a below-mentioned second coupling link 146 is attached.

(Fixed Bracket)

As illustrated in FIG. 4, the fixed bracket 100 has a body bracket 102 and a pair of attachment brackets 106. The body bracket 102 has a fixed wall 102A and a pair of support walls 102B. The fixed wall 102A is fixed to the upper face of the main body 12 with a screw not illustrated or the like.

The pair of support walls 102B stand up at both ends of the fixed wall 102A in the longitudinal direction, and are opposed to each other in the width direction of the electronic apparatus 10. As illustrated in FIG. 7, the support walls 102B of the body bracket 102 each have a rectangular through hole 104 into which the shaft portion 72A of the lower rotational shaft 72 is unrotatably inserted.

The attachment brackets 106 has a fixed wall 106A and a support wall 106B. The fixed wall 106A is fixed to the fixed wall 102A of the body bracket 102 with a screw not illustrated or the like.

The support wall 106B forms a pair with one support wall 102B of the body bracket 102, and is disposed opposed to the support wall 102B. The support wall 106B has a through hole 108 into which the shaft portion 72A of the lower rotational shaft 72 is rotatably inserted. The shaft portion 72A of the lower rotational shaft 72 is fixed to the support wall 106B with a nut 110.

The arm base 74, a collar member 112, a base torsion spring 114, and a washer 116 are disposed between the support walls 102B, 106B of the body bracket 102 and the attachment brackets 106. The arm base 74 is rotatably coupled to the pair of support walls 102B, 106B via the lower rotational shaft 72.

The collar member 112 is disposed between the arm base 74 and the attachment brackets 106. The collar member 112 is tubular, and receives the shaft portion 72A of the lower rotational shaft 72. The collar member 112 is inserted into the base torsion spring 114.

The base torsion spring 114 is a torsion coil spring having a larger spring constant than the arm torsion spring 88. The base torsion spring 114 and the arm torsion spring 88 are aligned in the axial direction of the lower rotational shaft 72. One end 114A of the base torsion spring 114 is locked at a notch-like locking portion 118 formed on the outer circumference of one support wall 74B of the arm base 74.

Figure 8:
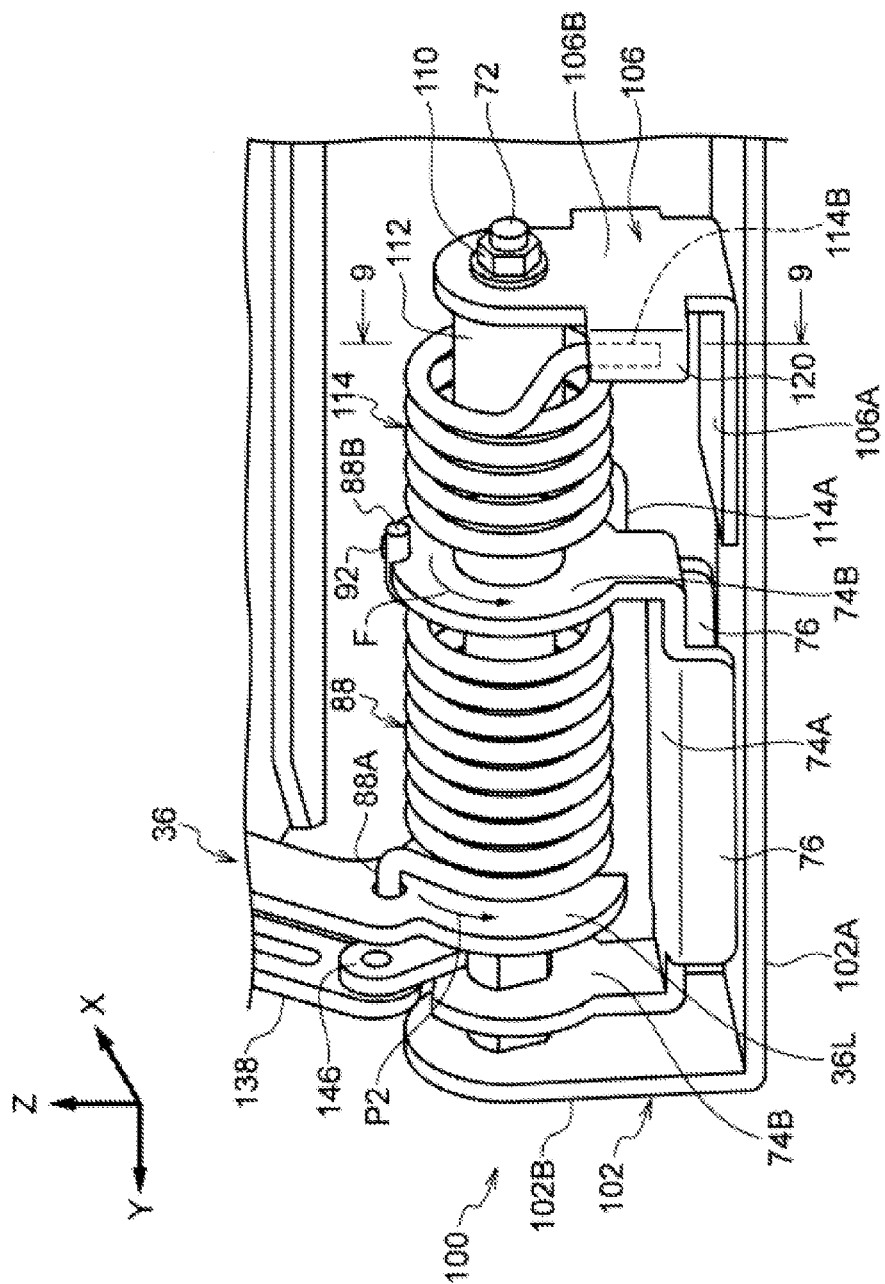
FIG. 8 is a perspective view illustrating a fixed bracket and an arm base in FIG. 5.
Figure 9:
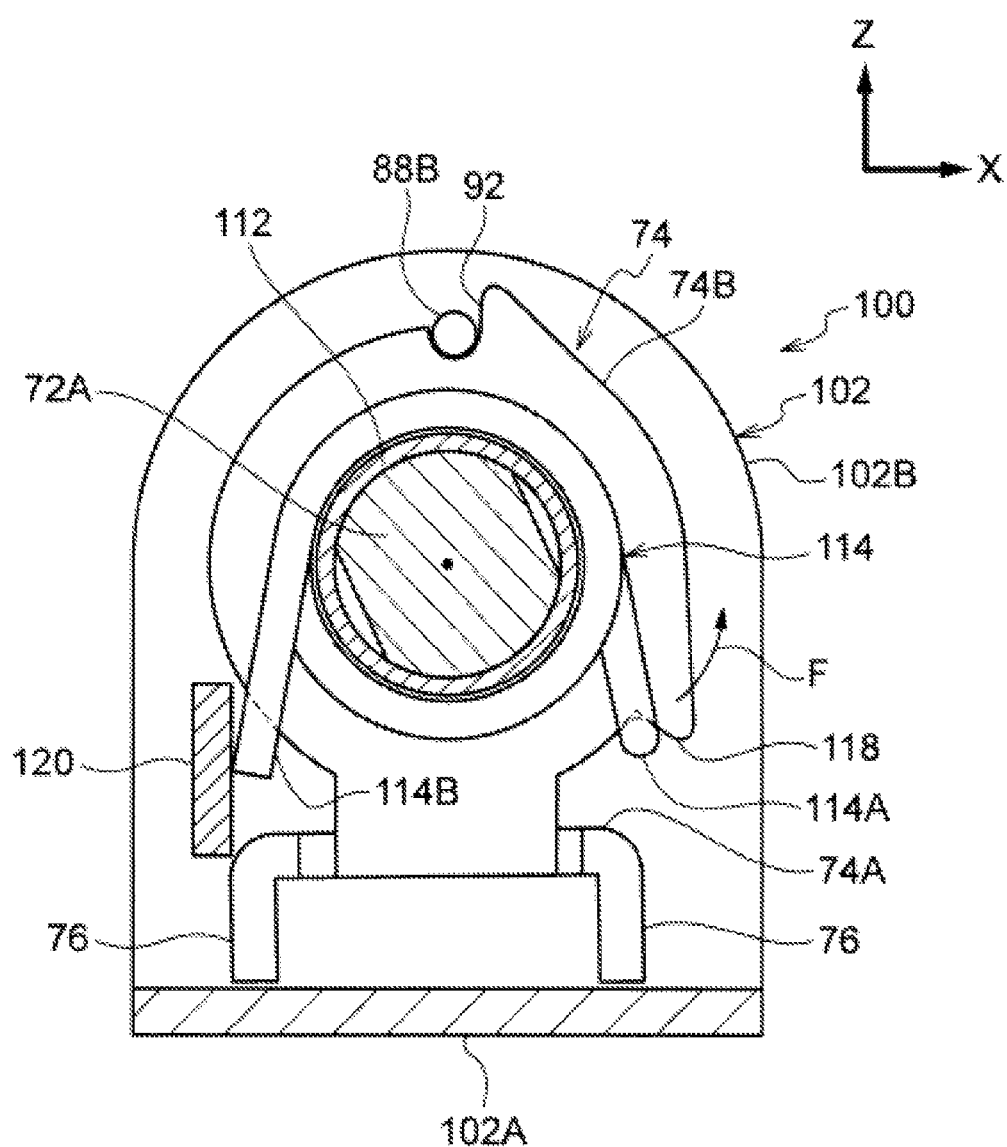
FIG. 9 is a sectional view taken along a line 9-9 in FIG. 8.

As illustrated in FIG. 8 and FIG. 9, the other end 114B of the base torsion spring 114 is locked at a wall-like locking portion 120 formed on the support wall 106B of the attachment brackets 106. The base torsion spring 114 biases the arm base 74 with respect to the fixed bracket 100 (body bracket 102) in the rising direction (direction of an arrow F) at all times. The base torsion spring 114 is an example of a base elastic body.

As illustrated in FIG. 9, the arm base 74 is provided with the pair of engaging portions 76. One of the pair of engaging portions 76 contacts the fixed wall 102A of the body bracket 102, thereby restraining the rotation of the arm base 74 with respect to the fixed bracket 100. The fixed wall 102A is an example of a stopper.

(Link Mechanism)

Figure 10:
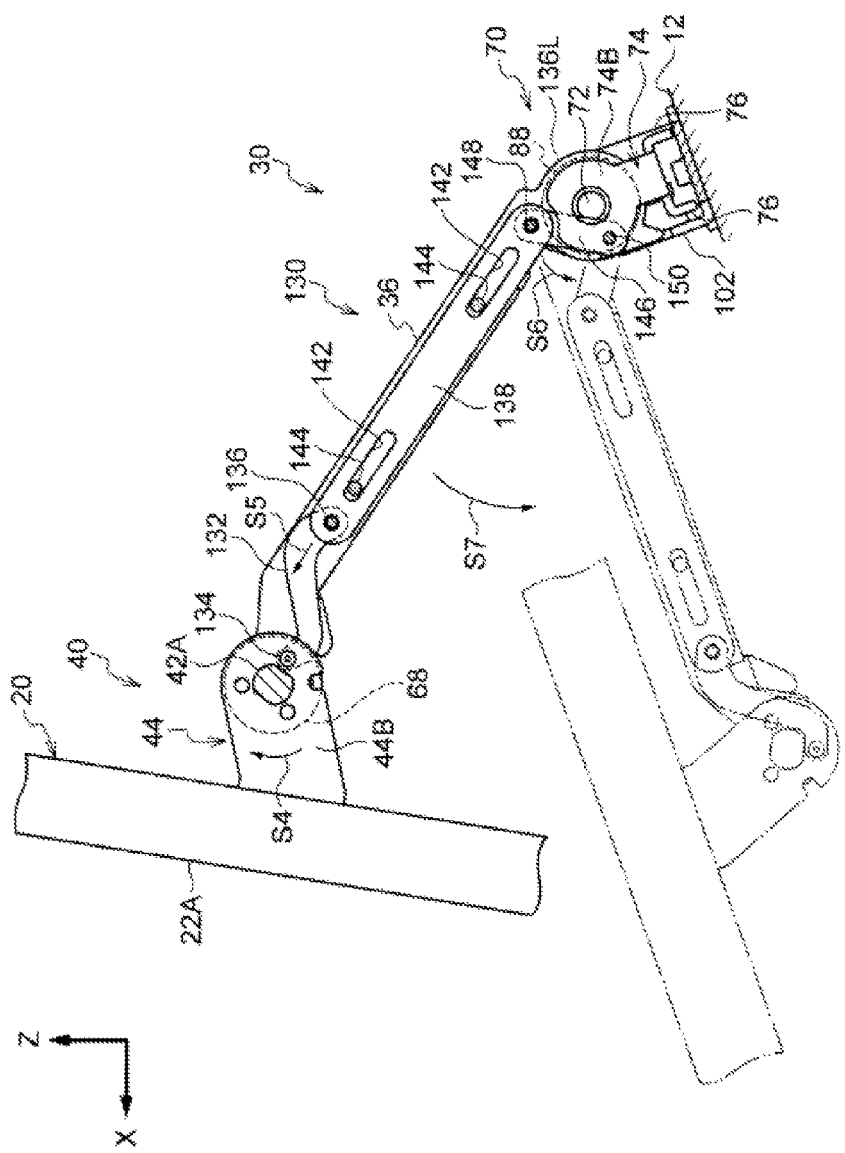
FIG. 10 is a side view illustrating the state where the movable arm is located at the retracted position.
Figure 11:
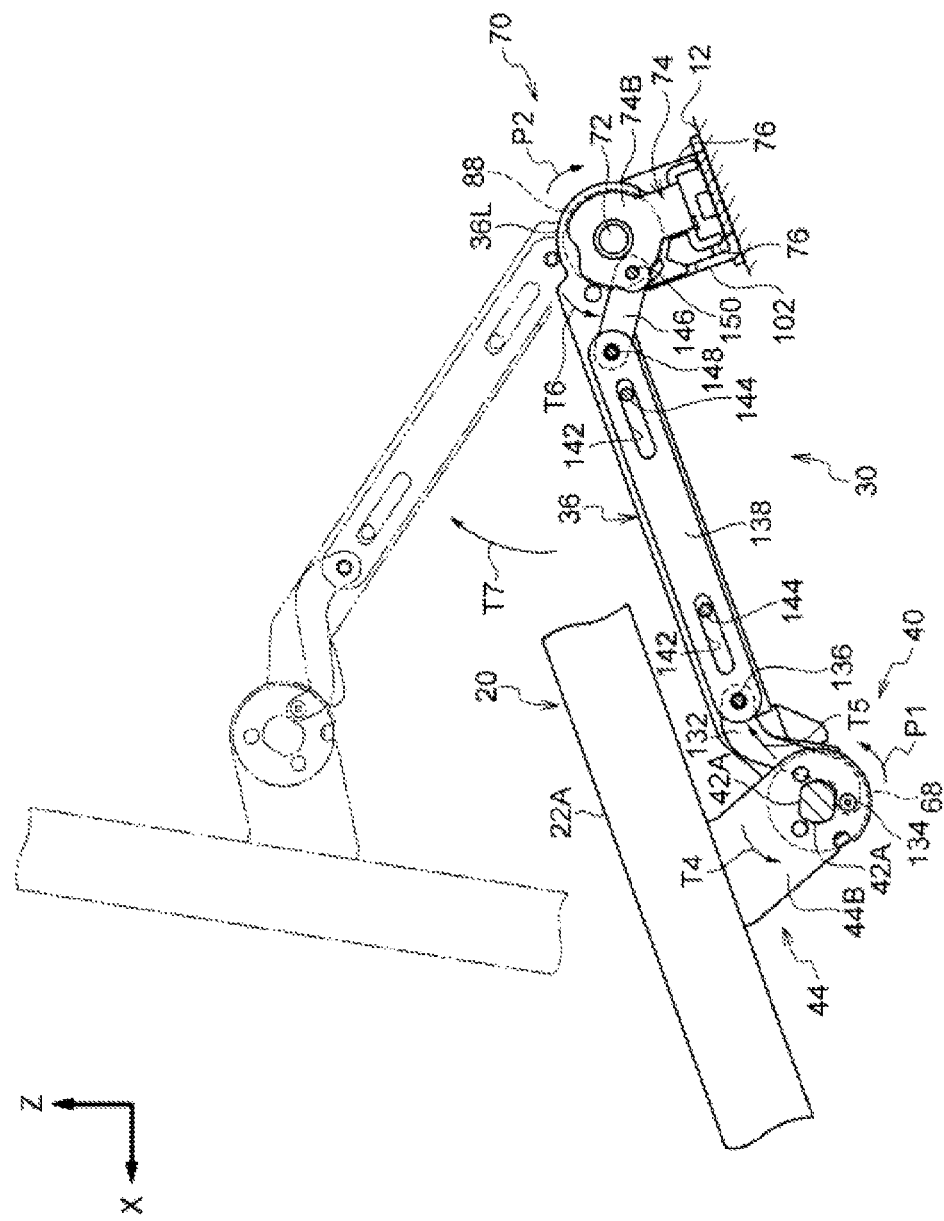
FIG. 11 is a side view illustrating the state where the movable arm is located at the expanded position.

As illustrated in FIG. 10 and FIG. 11, the link mechanism 130 is an example of an interlock mechanism that rotates the movable arms 36 in the direction opposite to the rotating direction of the display 20 with respect to the main body 12, with the rotation of the display 20 with respect to the movable arms 36. The link mechanisms 130 each has the first coupling link 132, a slider 138, and the second coupling link 146.

The first coupling link 132 is hook-like, and its one end is rotatably coupled to the support wall 44B of the hinge base 44 via a coupling shaft 134. The other end of the first coupling link 132 is rotatably coupled to the upper end of the slider 138 via a coupling shaft 136. The coupling shaft 136 is attached to the upper end of the slider 138 with a clip 140 (See FIG. 6).

The slider 138 is shaped like an oblong plate, and is disposed along the movable arms 36. The upper portion and the lower portion of the slider 138 each have a long hole 142 extending in the longitudinal direction of the slider 138. Guide pins 144 attached to the movable arms 36 are inserted into the respective long holes 142. The slider 138 is slidably coupled to the movable arms 36. The guide pins 144 are attached to the slider 138 with clips 145 (See FIG. 6).

One end of the second coupling link 146 is rotatably coupled to the lower end of the slider 138 via a coupling shaft 148. The other end of the second coupling link 146 is rotatably coupled to the support walls 74B of the arm base 74 via a coupling shaft 150. The coupling shaft 150 is located below the coupling shaft 148 and in front of the lower rotational shaft 72.

The coupling shaft 148 is attached to the lower end of the slider 138 with a clip 140 (See FIG. 7). The coupling shafts 134, 136, 148, and 150 each are a rotational shaft extending in the same direction as the extending direction of the upper rotational shaft 42 and the lower rotational shaft 72.

Next, an example of a method of adjusting the angle of the display 20 and the stand arm 30 will be described.

Figure 12:
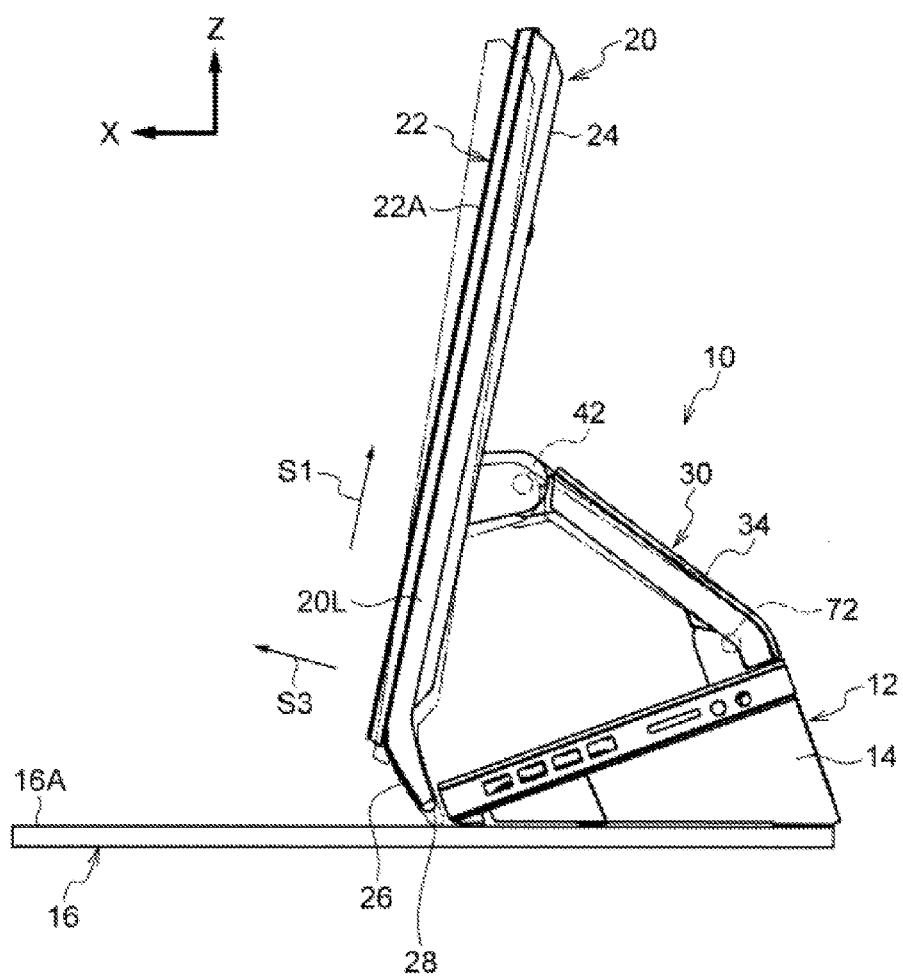
FIG. 12 is a side view illustrating the state where a display in FIG. 1 is lifted upward.

In FIG. 12, the display 20 located at the retracted position is expressed in a two-dot chain line. First, from this state, the user grips a lower portion 20L of the display 20 and lifts it slightly upward as expressed by a solid line (arrow S1) to cause the pair of legs 26 of the display 20 to float above the mounting face 16A.

Figure 13:
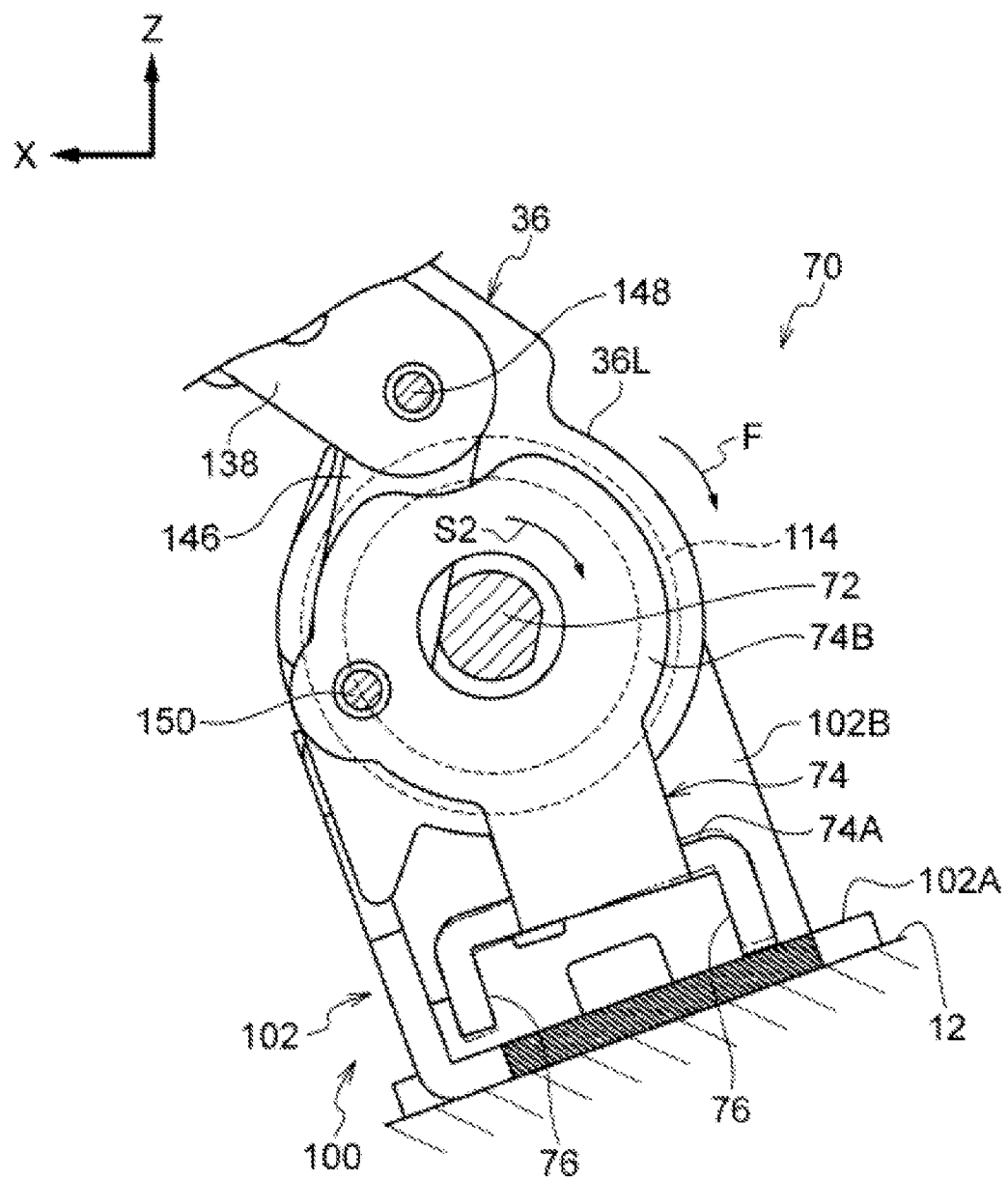
FIG. 13 is a side view illustrating the rotational state of the arm base when the display is located at the position in FIG. 12.

As a result, as illustrated in FIG. 13, the arm base 74 that supports the movable arms 36 rotates about the lower rotational shaft 72 in the rising direction of the movable arms 36 (arrow S2) with respect to the fixed bracket 100 (body bracket 102). At this time, a bias force F of the base torsion spring 114 aids the rotation of the arm base 74 in the rising direction (arrow S2). Accordingly, the user can readily lift the display 20 upward.

When the lower portion 20L of the display 20 is lifted upward, the display 20 rotates toward the lying position (arrow S3) with respect to the stand arm 30. At this time, as illustrated in FIG. 10, the link mechanisms 130 operate to cause the movable arms 36 to tilt forward (arrow S7) with respect to the arm base 74. Thus, in the state where the lower portion 20L of the display 20 is lifted upward, the rotation of the movable arms 36 in the rising direction (direction opposite to the arrow S7) with respect to the arm base 74 is locked. Accordingly, when the user grips the lower portion 20L of the display 20 and lifts it slightly upward, as illustrated in FIG. 13, the arm base 74 rotates in the rising direction (arrow S2) with respect to the fixed bracket 100.

As illustrated in Next, FIG. 12, the user pulls the lower portion 20L of the display 20 forward (arrow S3), and rotates the display 20 about the upper rotational shaft 42 from the standing position toward the lying position. This operates the link mechanisms 130 as follows.

That is, as illustrated in FIG. 10, when the display 20 rotates to the lying position with respect to the movable arms 36, the hinge base 44 rotates integrally with the display 20 (arrow S4). Thereby, one end of the first coupling link 132 coupled to the hinge base 44 enters below the shaft portion 42A of the upper rotational shaft 42, and the slider 138 coupled to the other end of the first coupling link 132 is pulled up toward the upper rotational shaft 42 along the movable arms 36 (arrow S5).

When the slider 138 is pulled up toward the upper rotational shaft 42, the second coupling link 146 coupled to the lower end of the slider 138 rotates about the coupling shaft 150 forward, that is, in the direction opposite to the rotating direction of the display 20 (arrow S6). With the rotation of the second coupling link 146, the slider 138 and the movable arms 36 are pulled downward. Thereby, the movable arms 36 rotates about the lower rotational shaft 72 in the lying direction toward the front side with respect to the arm base 74 (arrow S7). That is, the movable arms 36 rotate in the direction opposite to the rotating direction of the display 20.

As a result, as expressed by a two-dot chain line, the display 20 moves to the expanded position. At the expanded position, the display 20 is disposed at the user's hand with the display face 22A oriented upward. Accordingly, the user can readily touch the display face 22A of the display 20.

At the expanded position, when the pair of legs 26 of the display 20 are landed on the mounting face 16A, the arm base 74 rotates in the lying direction of the movable arms 36 (direction opposite to the arrow S2 in FIG. 13) with respect to the fixed bracket 100. Thereby, the arm base 74 returns to an initial position where the arm base 74 can rotate in the rising direction of the movable arms 36 with respect to the fixed bracket 100.

Figure 14:
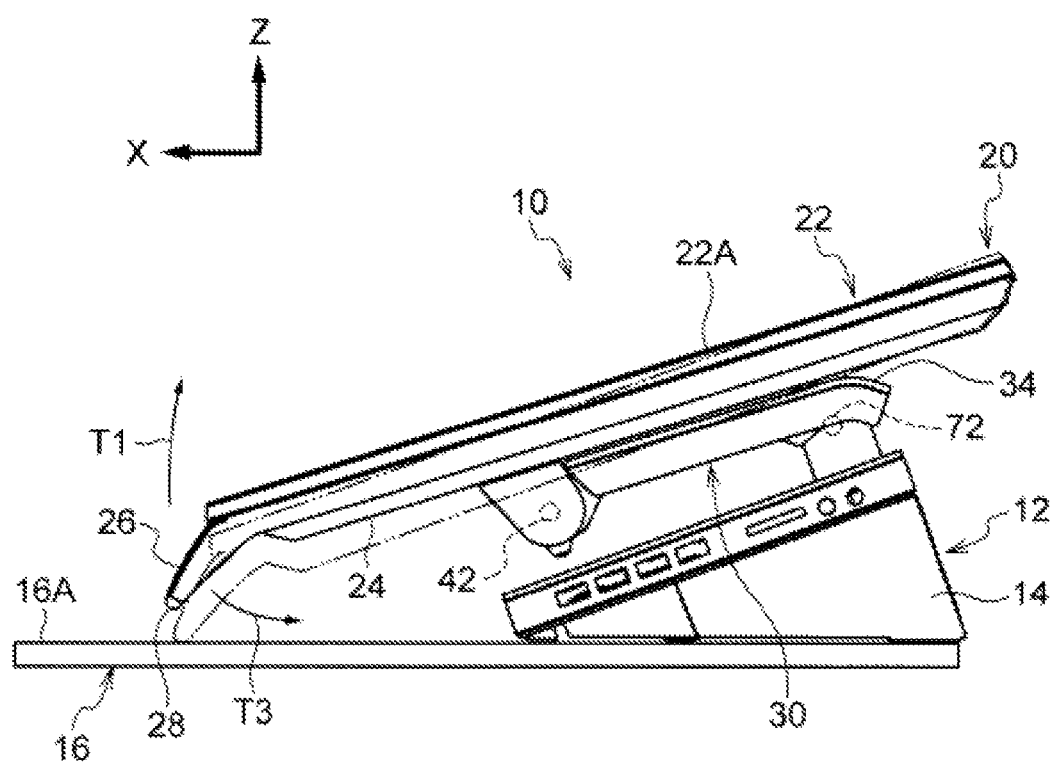
FIG. 14 is a side view illustrating the state where the display in FIG. 3 is lifted upward.

Next, when the display 20 is moved from the expanded position to the retracted position, as expressed by a solid line in FIG. 14, the user first grips the lower portion of the display 20 and lifts it slightly upward (arrow T1) to cause the pair of legs 26 to float from the mounting face 16A.

Figure 15:
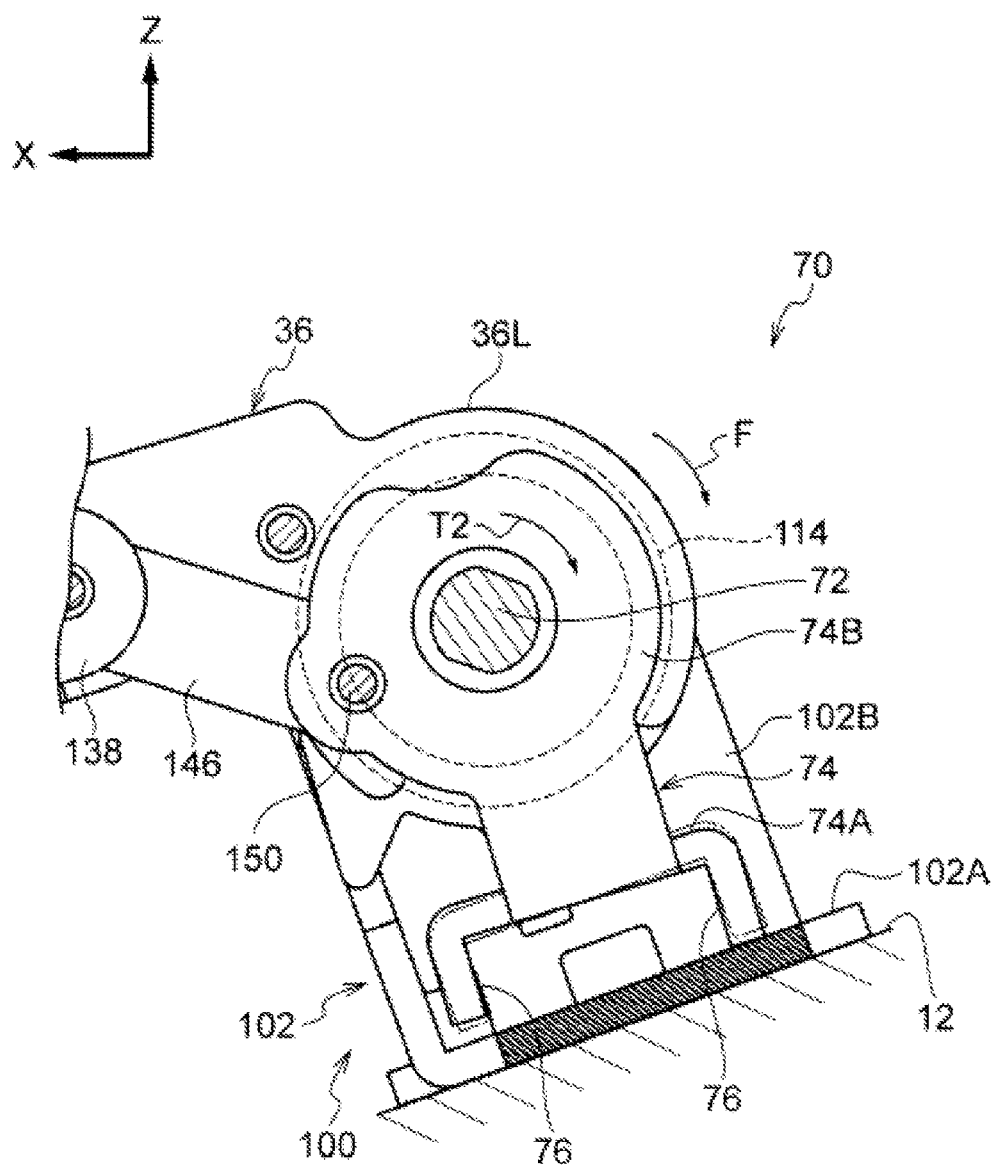
FIG. 15 is a side view illustrating the rotational state of the arm base when the display is located at the position in FIG. 14.

As a result, as illustrated in FIG. 15, the arm base 74 rotates about the lower rotational shaft 72 in the rising direction of the movable arms 36 (arrow T2) with respect to the fixed bracket 100. At this time, as described above, the bias force F of the base torsion spring 114 aids the rotation of the arm base 74 in the rising direction (arrow T2). Accordingly, the user can readily lift the display 20 upward.

As described above, in the state where the lower portion 20L of the display 20 is lifted upward, the rotation of the movable arms 36 with respect to the arm base 74 in the rising direction (arrow T7 in FIG. 11) is locked. Accordingly, when the user grips the lower portion 20L of the display 20 and lifts it slightly upward, as illustrated in FIG. 15, the arm base 74 rotates with respect to the fixed bracket 100 in the rising direction (arrow T2).

Next, as illustrated in FIG. 14, the lower portion of the display 20 is pushed rearward (arrow T3) to rotate the display 20 about the upper rotational shaft 42 to the standing position. This operates the link mechanisms 130 as follows.

That is, as illustrated in FIG. 11, when the display 20 rotates with respect to the movable arms 36 toward the standing position, the hinge base 44 rotates integrally with the display 20 (arrow T4). Thereby, one end of the first coupling link 132 moves to the back side of the upper rotational shaft 42, and the slider 138 is pushed toward the lower hinges 70 along the movable arms 36 (arrow T5).

When the slider 138 is pulled down toward the lower hinges 70, the second coupling link 146 rotates about the coupling shaft 150 rearward, that is, in the direction opposite to the rotating direction of the display 20 (arrow T6). With the rotation of the second coupling link 146, the slider 138 and the movable arms 36 are pulled upward and rearward. Thereby, the movable arms 36 rotate about the lower rotational shaft 72 and is raised in the rising direction with respect to the arm base 74 (arrow T7). That is, the movable arms 36 and the display 20 rotate in the opposite directions. As a result, the display 20 moves to the retracted position as expressed by a two-dot chain line.

At this time, a bias force P1 of the movable device torsion spring 68 provided at the upper hinge 40 aids the rotation of the display 20 toward the standing position (arrow T4) with respect to the movable arm 36. Further, a bias force P2 of the arm torsion spring 88 provided at the lower hinge 70 aids the rotation of the movable arms 36 in the rising direction (arrow T7) with respect to the arm base 74. Accordingly, the user can readily move the display 20 from the expanded position to the retracted position.

Then, when moving to the retracted position, the display 20 is disposed at the height of the user's eye at the standing position with the display face 22A oriented to the front side, display 20. Accordingly, the user can readily view the display face 22A of the display 20 as a monitor.

At the retracted position, when the pair of legs 26 of the display 20 are landed on the mounting face 16A, the arm base 74 rotates in the lying direction of the movable arms 36 (opposite to arrow T2 in FIG. 15) with respect to the fixed bracket 100. Thereby, the arm base 74 returns to the initial position where the arm base 74 can rotate in the rising direction of the movable arms 36 with respect to the fixed bracket 100.

Next, effects of this embodiment will be described.

Figure 16:
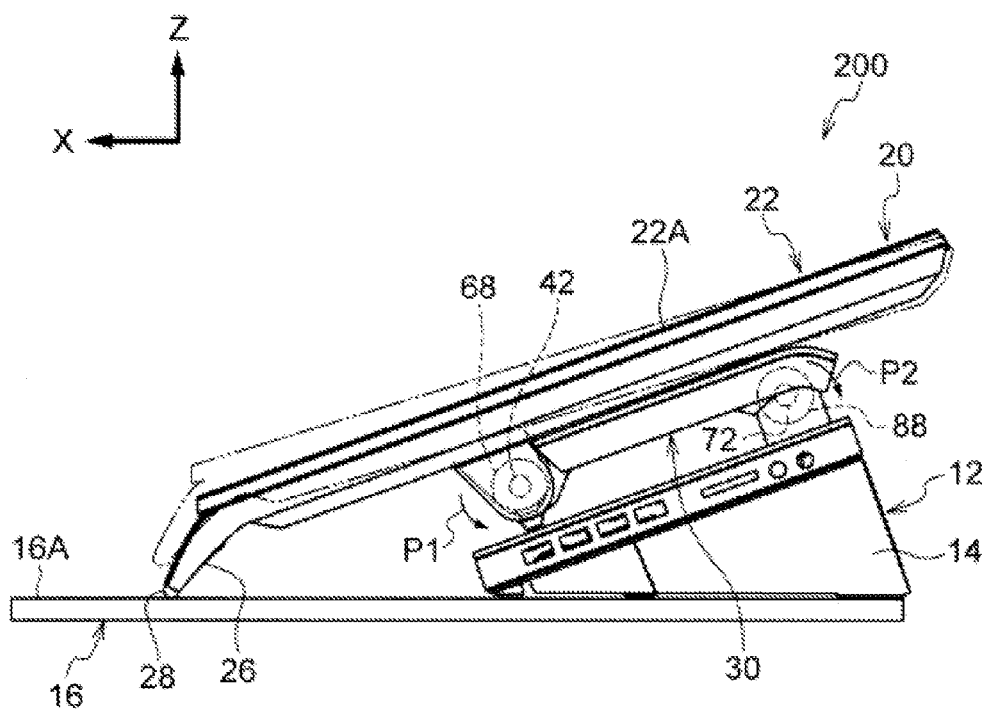
FIG. 16 is a side view illustrating an electronic apparatus in a comparative example.
Figure 17:
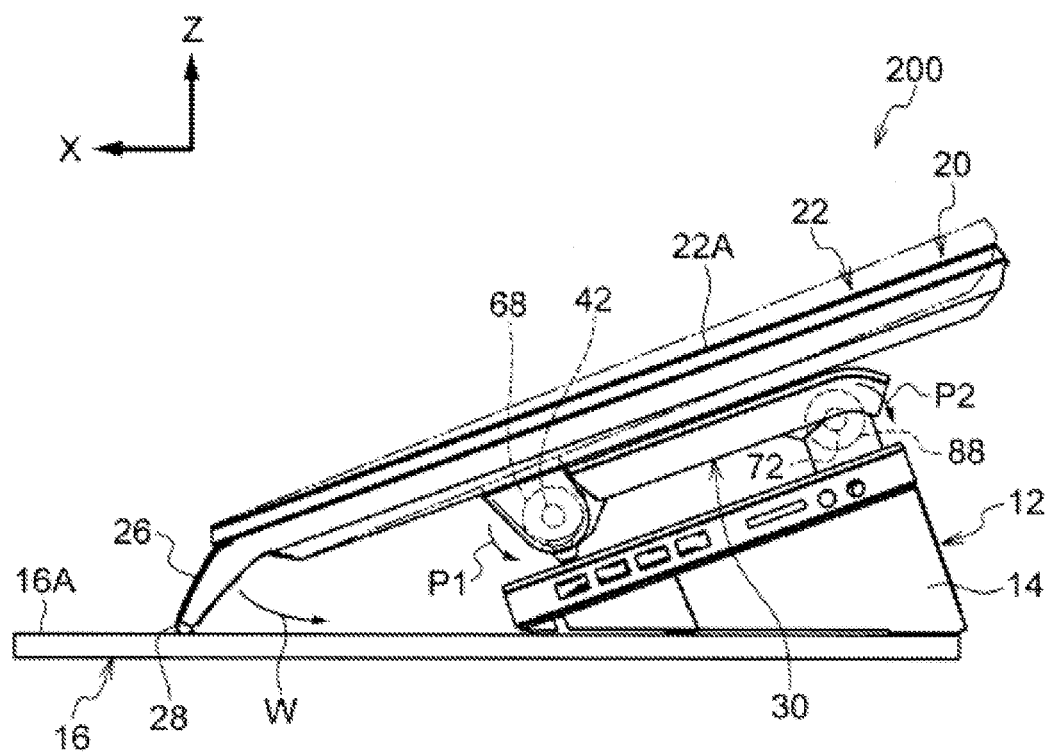
FIG. 17 is a side view illustrating the electronic apparatus in the comparative example.

First, an electronic apparatus in a comparative example will be described. FIG. 16 and FIG. 17 illustrate an electronic apparatus 200 in the comparative example. The electronic apparatus 200 does not include the fixed bracket 100 and the base torsion spring 114 in this embodiment, and the arm base 74 (See FIG. 5) is directly fixed to the main body 12.

In the electronic apparatus 200 in the comparative example, the spring constant of the arm torsion spring 88 may be increased such that the user can readily lift the display 20 upward.

Given that, as illustrated in FIG. 2, a distance L between the lower portion 20L of the display 20 (action point), which is held by the user, and the lower rotational shaft 72 that is the rotational center (axis) if the stand arm 30 becomes larger as the stand arm 30 tilts. That is, the distance L becomes larger as a tilt angle $\theta$ of the movable arms 36 is larger. Accordingly, as illustrated in a graph 160 in FIG. 18, a lifting force M to lift the display 20 upward becomes smaller as the tilt angle $\theta$ of the movable arms 36 is larger due to the action of a lever, and becomes minimum at the expanded position.

As illustrated in graphs 162 and 164, the bias force P2 of the arm torsion spring 88 becomes larger as the tilt angle $\theta$ of the movable arms 36 is larger, and becomes maximum at the expanded position. The spring constant of the arm torsion spring 88 in the graph 162 is different from the spring constant of the arm torsion spring 88 in the graph 164, and is larger than the spring constant in the graph 164.

Accordingly, as illustrated in the graph 162, when the spring constant of the arm torsion spring 88 increases depending on the lifting force M of the display 20 at the retracted position, the bias force P2 of the arm torsion spring 88 may exceed the lifting force M of the display 20 at the expanded position.

In this case, as expressed by a two-dot chain line in FIG. 16, the movable arms 36 may not reach the predetermined expanded position, so that the legs 26 of the display 20 may not be landed on the mounting face 16A. If the legs 26 of the display 20 are not landed on the mounting face 16A, as expressed by a two-dot chain line in FIG. 17, the display 20 may be rotated toward the standing position (arrow W) with the bias force P1 of the movable device torsion spring 68 of the upper hinge 40. In this case, the rotational range of the movable arms 36 becomes small.

Especially, in this embodiment, when the arm torsion spring 88 biases the movable arm 36 in the rising direction (arrow P2), the display 20 is biased toward the standing position (arrow W) via the link mechanisms 130. Accordingly, when the spring constant of the arm torsion spring 88 becomes large, the display 20 may tend to rotate toward the standing position (arrow W), and the rotational range of the movable arms 36 may become small.

Figure 18:
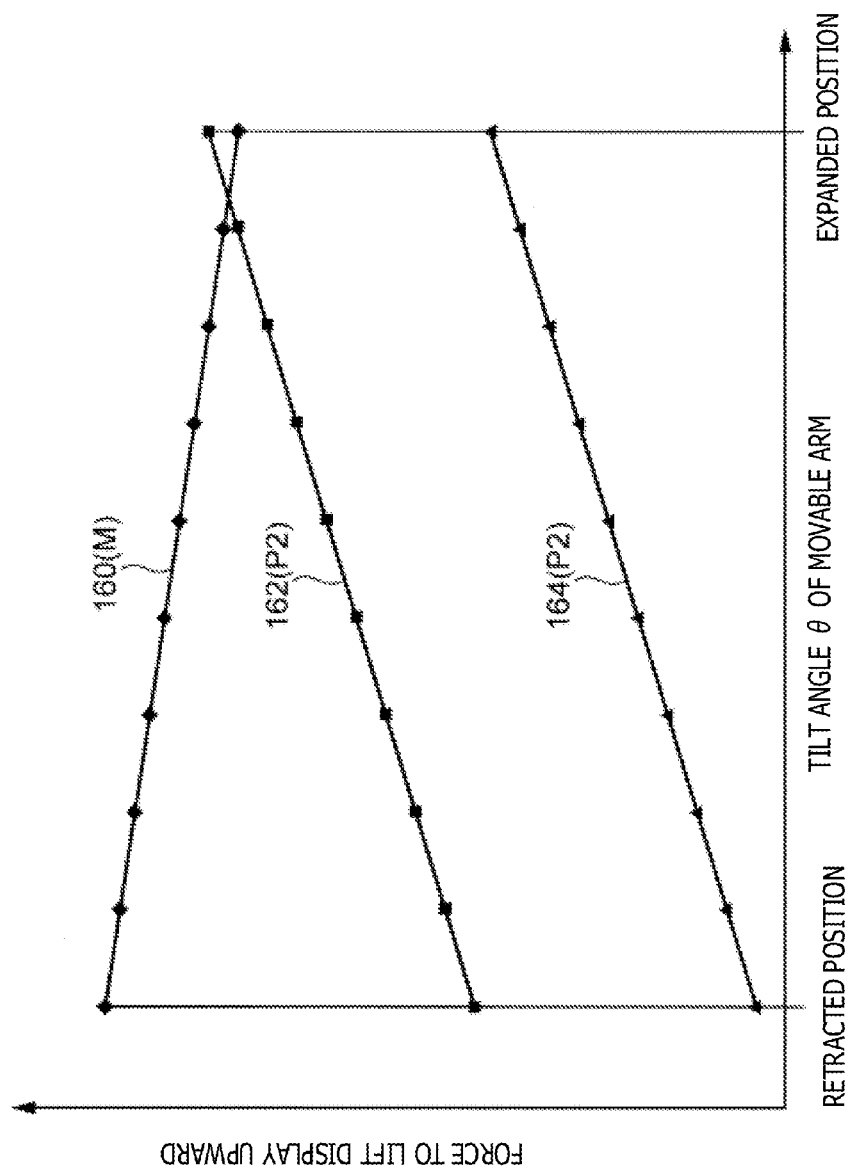
FIG. 18 is a graph illustrating relation between a force to lift the display upward and a tilt angle of a movable arm in the electronic apparatus in the comparative example.

On the other hand, for example, when the spring constant of the arm torsion spring 88 becomes small depending on the lifting force M of the display 20 at the expanded position as illustrated in graph 164 in FIG. 18, a sufficient bias force P2 may not be acquired from the arm torsion spring 88 at the retracted position. In this case, it is difficult for the user to lift the display 20 upward at the retracted position.

On the other hand, the electronic apparatus 10 in this embodiment includes the base torsion spring 114 that aids upward lifting of the display 20 in addition to the arm torsion spring 88 that aids the rotation of the movable arms 36 from the expanded position to the retracted position. The bias force F of the base torsion spring 114 does not change even when the movable arms 36 tilts with respect to the arm base 74.

Figure 19:
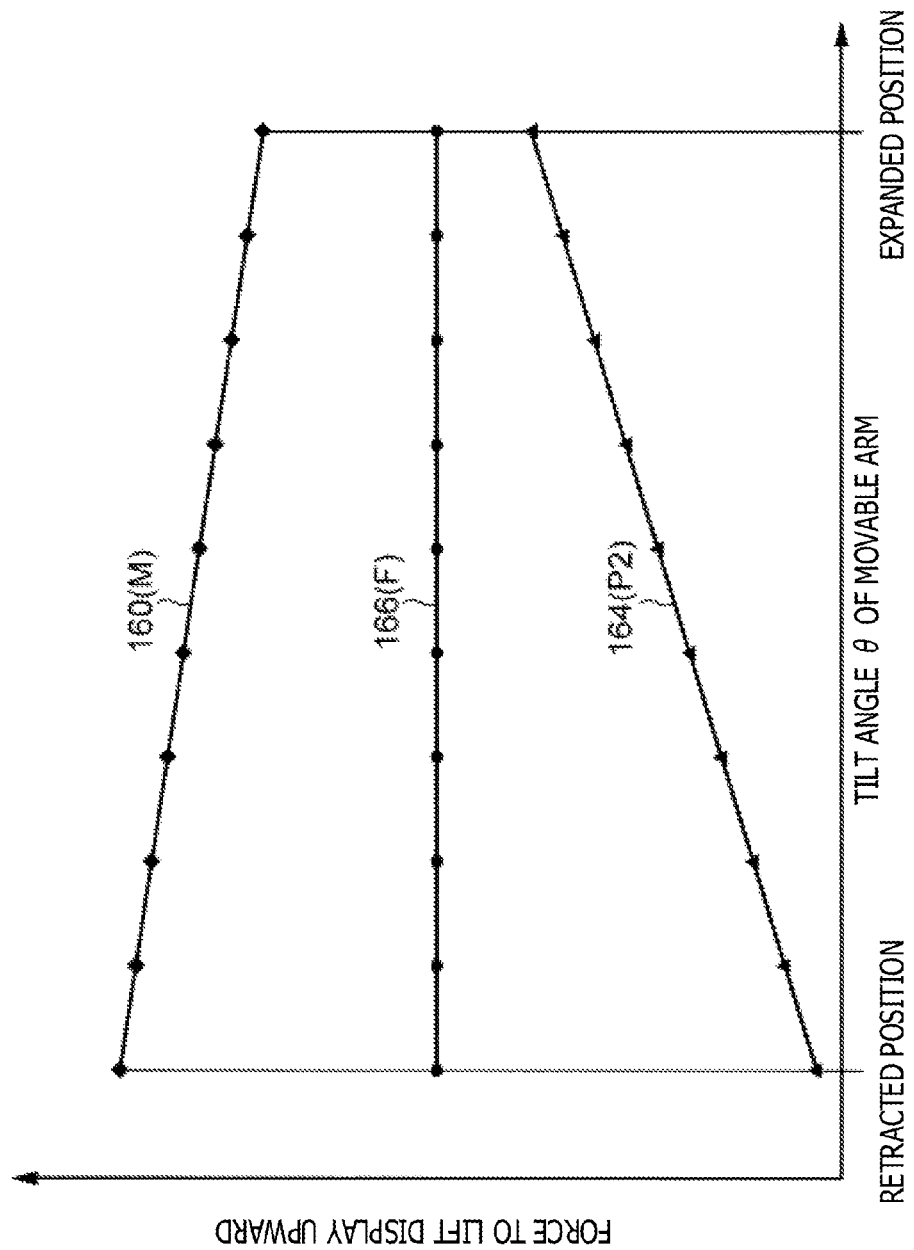
FIG. 19 is a graph illustrating relation between a force to lift the display in FIG. 2 upward and the tilt angle of the movable arm.

Therefore, for example, as illustrated in a graph 166 in FIG. 19, the spring constant of the base torsion spring 114 can be set depending on the lifting force M of the display 20 at the retracted position. Therefore, the user can readily lift the display 20 at both of the retracted position and the expanded position. In this embodiment, since the rotating amount of the arm base 74 with respect to the fixed bracket 100 is small, in FIG. 19, the bias force F of the base torsion spring 114 is substantially invariant.

As in the electronic apparatus 200 in the comparative example, rotation of the movable arms 36 from the expanded position to the retracted position is aided by the arm torsion spring 88. This facilitates movement of the display 20 from the expanded position to the retracted position.

As described above, the electronic apparatus 10 in this embodiment includes the arm torsion spring 88 and the base torsion spring 114. Thus, the force (bias force P2) to aid the rotation of the movable arms 36 from the expanded position to the retracted position and the force (bias force F) to aid upward lifting of the display 20 can be optimized. Therefore, the operability of movement of the display 20 is improved.

The rotation of the display 20 with respect to the movable arms 36 and the rotation of the movable arms 36 with respect to the arm base 74 are interlocked by the link mechanisms 130. The upper hinge 40 is further provided with a movable device torsion spring 68. The movable device torsion spring 68 aids the rotation of the display 20 toward the standing position with respect to the movable arms 36. Consequently, the operability of the display 20 is further improved.

The arm base 74 is further provided with the pair of engaging portions 76. One of the pair of engaging portions 76 engages with the fixed wall 102A of the body bracket 102, limiting the rotational range of the arm base 74 with respect to the fixed bracket 100 to a predetermined range. Therefore, a damage of the arm base 74 can be suppressed.

The movable arms 36 and the arm base 74 rotate about the lower rotational shaft 72. Thus, in this embodiment, as compared to the case where the rotational shaft of the movable arms 36 and the rotational shaft of the arm base 74 are different from each other, the number of components is smaller. Therefore, manufacturing costs of the electronic apparatus 10 can be reduced.

Further, the rotational shaft of the movable arms 36 and the rotational shaft of the arm base 74 are coaxially located. In this embodiment, as compared to the case where the rotational shaft of the movable arms 36 and the rotational shaft of the arm base 74 are not coaxially located, the electronic apparatus 10 can be made more compact. Moreover, in this embodiment, the base torsion spring 114 and the arm torsion spring 88 are aligned in the axial direction of the lower rotational shaft 72. Therefore, the electronic apparatus 10 can be further reduced in size.

Next, modification examples of the above embodiment will be described.

Although the movable arms 36 and the arm base 74 rotates about the lower rotational shaft 72 in the above embodiment, the movable arms 36 and the arm base 74 may rotate about different rotational shafts.

Although the arm torsion spring 88 and the base torsion spring 114 are aligned in the axial direction of the lower rotational shaft 72 in the above embodiment, the arm torsion spring 88 and the base torsion spring 114 may be arranged as appropriate.

Although the spring constant of the base torsion spring 114 is larger than the spring constant of the arm torsion spring 88 in the above embodiment, the spring constant of the base torsion spring 114 may be the spring constant of the arm torsion spring 88 or less.

Although the arm elastic body is the arm torsion spring 88 in the above embodiment, the arm elastic body may be an elastic body such as a flat spring. Similarly, the base elastic body and the movable device elastic body each may be an elastic body such as a flat spring.

Although the interlock mechanism is the link mechanism 130 in the above embodiment, the interlock mechanism may be a gear mechanism.

Although the movable device is the display 20 including the touch panel 22 in the above embodiment, the movable device may be an operational panel including a push button.

Although the lower end of the stand arm 30 is fixed to the main body 12 in the above embodiment, the lower end of the stand arm 30 may be fixed to a base or the like.

Although the embodiments of this application have been described, the technique disclosed in this application is not limited to the above embodiments. The embodiments and the various modification examples may be combined as appropriate, and may be implemented in various modes without deviating from the spirit of this application.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic apparatus comprising:
   a fixed bracket;
   an arm base that is rotatably coupled to the fixed bracket;
   a movable arm that is coupled to the arm base and tilts with respect to the arm base;
   a movable device that is coupled to the movable arm, and that rotates with respect to the movable arm and is landed on a mounting face;
   an arm elastic body that is provided on the arm base, and biases the movable arm in a rising direction in which the movable arm is raised against the mounting face;
   a base elastic body that is provided on the fixed bracket, and biases the arm base in the rising direction of the movable arm; and
   an interlock mechanism that couples the movable device to the arm base, and rotates the movable arm in a direction opposite to a rotating direction of the movable device with a rotation of the movable device with respect to the movable arm.

2. The electronic apparatus according to claim 1, wherein the base elastic body biases the movable arm in the rising direction via the arm base.

3. The electronic apparatus according to claim 1, wherein a rotational shaft of the arm base and a rotational shaft of the movable arm are coaxially located.

4. The electronic apparatus according to claim 3, wherein the arm elastic body and the base elastic body each are a torsion coil spring, and are aligned in an axial direction of the rotational shaft of the arm base.

5. The electronic apparatus according to claim 1, wherein a spring constant of the base elastic body is larger than a spring constant of the arm elastic body.

6. The electronic apparatus according to claim 1, wherein the movable device in a state of being landed on the mounting face is supported by the movable arm.

7. The electronic apparatus according to claim 1, wherein the movable device has a leg that is landed on the mounting face.

8. The electronic apparatus according to claim 1, wherein the movable device moves between a standing position and a lying position while rotating with respect to the movable arm, and the interlock mechanism tilts the movable arm as the movable device moves from the standing position toward the lying position, and raises the movable arm as the movable device moves from the lying position toward the standing position.

9. The electronic apparatus according to claim 8, wherein the movable device is coupled to the movable arm via an upper hinge, and
the upper hinge is provided with a movable device elastic body that biases the movable device toward the lying position.

10. The electronic apparatus according to claim 8, wherein
the interlock mechanism is a link mechanism.

11. The electronic apparatus according to claim 10, wherein
the interlock mechanism includes:
a slider that slides along the movable arm;
a first coupling link that couples the movable device to the slider, and moves the slider along the movable arm with a rotation of the movable device with respect to the movable arm; and
a second coupling link that couples the slider to the arm base, and rotates the movable arm in a direction opposite to a rotating direction of the movable device with a movement of the slider.

12. The electronic apparatus according to claim 8, wherein
the movable device is a display with a front surface having a display face, and
the movable device directs the display face to a front side at the standing position, and directs the display face to an upper side at the lying position.

13. An electronic apparatus comprising:
a fixed bracket;
an arm base that is rotatably coupled to the fixed bracket;
a movable arm that is coupled to the arm base and tilts with respect to the arm base;
a movable device that is coupled to the movable arm, and that rotates with respect to the movable arm and is landed on a mounting face;
an arm elastic body that is provided on the arm base, and biases the movable arm in a rising direction in which the movable arm is raised against the mounting face;
a base elastic body that is provided on the fixed bracket, and biases the arm base in the rising direction of the movable arm; and
a stopper configured to restrain the rotation of the arm base in the rising direction with respect to the fixed bracket.

14. An electronic apparatus comprising:
a fixed bracket;
an arm base that is rotatably coupled to the fixed bracket;
a movable arm that is coupled to the arm base and tilts with respect to the arm base;
a movable device that is coupled to the movable arm, and that rotates with respect to the movable arm and is landed on a mounting face;
an arm elastic body that is provided on the arm base, and biases the movable arm in a rising direction in which the movable arm is raised against the mounting face; a base elastic body that is provided on the fixed bracket, and biases the arm base in the rising direction of the movable arm; and
a main body to which the fixed bracket is fixed, and which is mounted on the mounting face.

15. An arm device comprising:
a fixed bracket;
an arm base that is rotatably coupled to the fixed bracket;
a movable arm that is coupled to the arm base, and tilts with respect to the arm base;
an upper hinge that is rotatably coupled to the movable arm;
an arm elastic body that is provided on the arm base, and biases the movable arm in a rising direction in which the movable arm is raised against a mounting face; and
a base elastic body that is provided on the fixed bracket, and biases the arm base in the rising direction of the movable arm; and
an interlock mechanism that couples the upper hinge to the arm base, and rotates the movable arm in a direction opposite to a rotating direction of the upper hinge with a rotation of the upper hinge with respect to the movable arm.

16. The arm device according to claim 15, wherein
a rotational shaft of the arm base and a rotational shaft of the movable arm are coaxially located.

17. The arm device according to claim 16, wherein
the arm elastic body and the base elastic body each are a torsion spring, and are aligned in the axial direction of the rotational shaft of the arm base.

18. The arm device according to claim 15, wherein the interlock mechanism includes:
a slider that slides along the movable arm;
a first coupling link that couples the upper hinge to the slider, and moves the slider along the movable arm with a rotation of the upper hinge with respect to the movable arm; and
a second coupling link that couples the slider to the arm base, and rotates the movable arm in a direction opposite to a rotating direction of the upper hinge with a movement of the slider.

* * * * *